United States Patent Office 3,187,658
Patented June 8, 1965

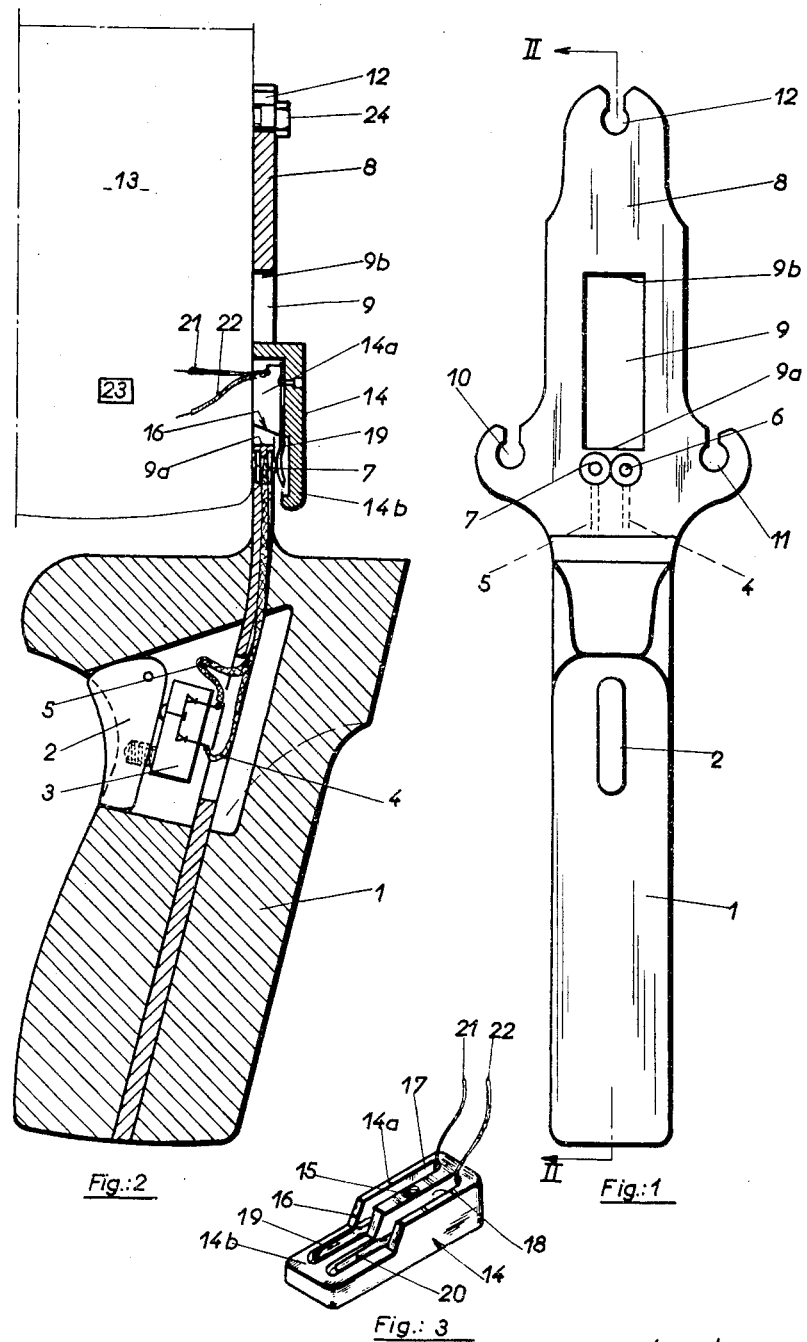

3,187,658
HANDLE ASSEMBLY FOR CAMERAS
André Victor Léon Clément Debrie, 111 Rue Saint-Maur, Paris, France
Filed Feb. 8, 1962, Ser. No. 171,957
Claims priority, application France, Feb. 20, 1961, 853,270
9 Claims. (Cl. 95—86)

In my copending application Serial No. 84,603 filed on January 24, 1961, now abandoned, I have described a cinematographic camera, in which the principal parts, mechanisms and various devices are easily accessible and can be separately removed and replaced by even non-specialist personnel. This apparatus comprises in particular a removable handle mounted on the lower part of the casing and provided with a trigger for controlling an electric motor serving to drive the mechanism of the apparatus, this motor being itself removable and being fixed by a bayonet joint on the bottom of the said casing.

The present invention has for its principal object an improved removable handle which can be mounted indifferently with reversed directions, this handle being surmounted for that purpose by a small plate or other suitable member designed to be fixed on the body of the apparatus and being fixable either in a given position or in the corresponding inverse position. This plate is provided, according to one preferred form of embodiment of the invention, with contact studs connected to a switch operated by the trigger and automatically establishing contact with the internal electric circuit of the apparatus during the placing in position of the said plate, irrespective of its position of fixing, or on the contrary being automatically disconnected when the plate is removed.

Arrangements permitting of the automatic connection and disconnection of electric contacts by the mounting in position or removal of removable members of a cinematographic apparatus without it being necessary to make the connections and disconnections by hand, as the case may be, have already been proposed by the present applicant, in the said copending application for the electronic unit belonging to the sound recording equipment. This conception may obviously be extended to other removable parts, in respect of which a similar problem exists.

The description which follows below with reference to the accompanying drawings (which are given by way of example and not in any limitative sense) will make it quite clear how the invention may be carried into effect, the particular features which are brought out either in the text or in the drawings being understood to form a part of the said invention.

FIG. 1 is a view in elevation of an improved handle.

FIG. 2 is a section of this handle taken along the line II—II of FIG. 1.

FIG. 3 is a perspective view of one part of the contact device.

In the form of embodiment shown in the drawings, there can be seen at 1 the handle proper, with its trigger 2 for actuating a switch 3 connected to conductors 4 and 5. The latter terminate at contact studs 6 and 7 fixed, with appropriate insulation, on a small plate 8 rigidly fixed to the handle, these studs having the form of rivets and each having projecting heads on both faces of the plate. A central opening 9 of rectangular shape and also three peripheral slots 10, 11 and 12 are formed in this plate 8.

For its part, the cinematographic apparatus, of which the casing is shown diagrammatically at 13 in FIG. 2, carries on its front face an insulating member 14 which can be produced by moulding and having a generally parallelepiped shape of dimensions very slightly less than those of the rectangular opening 9. This insulating member has an upper portion 14a which is applied against the casing 13 and is fixed thereto by a screw (not shown) passing through a central hole 15 formed in the said member; this upper portion 14a is coupled towards the bottom by a shoulder 16 to an extension 14b which leaves a certain space between the extension and the front face of the casing 13. Two parallel grooves 17 and 18 are formed in the body of the insulating member 14, and elastic contact blades 19 and 20 are housed in these grooves. These contact blades are connected to conductors 21 and 22 forming part of the internal electric circuit of the apparatus, and more particularly of the excitation circuit of a relay 23 which serves to control the motor or motors driving the mechanism of the apparatus.

The mounting in position of the removable handle which has just been described is effected in the following manner:

One of the faces of the plate 8 is applied against the front face of the casing 13 after the rectangular opening 9 has been placed opposite the insulating member 14, which can thus be engaged in this opening, and the handle is then given a slight lateral movement upwards until the lower edge 9a of the opening comes into abutment against the shoulder 16 of the member 14. In this position of the plate 8, the contacts 6 and 7 come into engagement with the elastic blades 19 and 20. The plate is then fixed on the apparatus by three knurled-head captive screws engaged in the slots 10, 11 and 12, and of which only the upper screw 24 can be seen in FIG. 2.

It is only necessary to press the trigger 2 in order to operate the switch 3 and close the operating circuit of the control relay 23 by the conductors 4 and 5, the contact studs 6 and 7, the spring blades 19 and 20 and the conductors 21 and 22. The relay 23 puts into operation, when so required, the converter employed for the supply of the apparatus, and also puts the apparatus under voltage, whether it is connected to the converter or directly to the supply mains.

The removal of the handle is carried out in the reverse sequence to the mounting: the three screws 24 are slackened-off, the handle is given a lateral downward movement until the upper edge 9b of the rectangular opening 9 comes into abutment with the insulating member 14. The contact studs 6 and 7 are then no longer in contact with the blades 19 and 20, and the plate 9 is freed from the insulating member 14.

It is clear that it is possible to mount the handle 1 either in the position illustrated in FIG. 2, that is to say inclined towards the rear, or in the reverse position, the plate 8 being then reversed and the handle inclined towards the front; the contacts of the studs 6 and 7 with the blades 19 and 20 are automatically ensured in both cases, since the studs each project from the opposite faces of the plate. The handle may thus be located farther forward or farther towards the rear, as described by the user.

The almost-central arrangement of the fixing plate 8 with respect to the handle proper 1, as illustrated in the drawings, may be replaced by an arrangement giving definitely more displacement, by providing the plate 8 with a square or other profile having a desired deviation of length, with the object of increasing the difference between the two possible positions of mounting of the handle.

What is claimed is:

1. In a camera, in combination, a camera housing having an exterior surface portion; a handle; an extension fixed to and extending from said handle, said extension having a pair of exterior faces directed away from each other and one or the other of which is adapted to be placed in engagement with said surface portion of said housing at the option of the operator; and fastening means engaging said extension and said housing for releasably fastening said extension to said housing with a selected one of said faces of said extension engaging said surface portion of said housing, so that said handle may be connected to said housing in either one of a pair of different positions.

2. In a camera, in combination, a camera housing having an exterior surface portion; a handle; an extension fixed to and extending from said handle, said extension having a pair of opposed faces one or the other of which is adapted to be placed in engagement with said surface portion of said housing at the option of the operator; and fastening means engaging said extension and said housing for releasably fastening said extension to said housing with a selected one of said faces of said extension engaging said surface portion of said housing, so that said handle may be connected to said housing in either one of a pair of different positions.

3. In a camera as recited in claim 2, said handle and extension defining between themselves an angle greater than 90° but less than 180°, so that said handle will have opposite inclinations with respect to said housing in said different positions, respectively.

4. In a camera as recited in claim 2, said surface portion of said housing being flat and said extension being in the form of a flat, rigid plate provided with said opposed faces.

5. In a camera as recited in claim 4, said fastening means being in the form of headed screw members threaded into said housing at said surface portion thereof, said plate being formed with cutouts through which said screw members extend with the heads thereof engaging that face of said plate which is directed away from said surface portion of said housing.

6. In a camera, in combination, a camera housing having an exterior surface portion; a handle; a switch carried by said handle; a switch-operating trigger also carried by said handle for closing and opening said switch at the option of the operator; a pair of electrical conductors extending from said switch; a plate fixed to and extending from said handle; a pair of electrical contacts carried by said plate and respectively connected electrically with said conductors, each contact having a pair of exposed ends respectively located at opposed faces of said plate, said plate being adapted to be placed with one or the other of said opposed faces thereof in engagement with said surface portion of said housing at the option of the operator; fastening means engaging said plate and said housing for releasably fastening said plate to said housing with a selected one of said faces of said plate engaging said surface portion of said housing, so that said handle may be connected to said housing in either one of a pair of different positions; and a second pair of electrical contacts carried by said housing in the region of said surface portion thereof and respectively engaging said first-mentioned pair of electrical contacts at the ends thereof which are exposed at one of the faces of said plate irrespective of which of said faces engages said surface portion of said housing, whereby an electrical circuit which includes said second pair of contacts can be completed or opened by manipulation of said trigger when said handle is connected to said housing in either of said positions.

7. In a camera, in combination, a camera housing having an exterior surface portion; a contact carrier fixed to said housing at said surface portion thereof and having a free end portion spaced from and defining a gap with said surface portion of said housing; a pair of electrical contacts carried by said contact carrier, extending into said gap, and being spaced from said surface portion of said housing; a rigid plate formed with an opening at least slightly greater than said carrier so that the latter can pass through said opening, said plate having a pair of opposed faces one or the other of which can be placed in engagement with said surface portion of said housing with said carrier extending through said opening, said plate being shiftable with respect to said surface portion of said housing to a position where a portion of said plate is located between said contacts and said surface portion of said housing after said plate is placed with one or the other of said faces thereof, at the option of the operator, in engagement with said housing with said carrier extending through said opening; a second pair of electrical contacts carried by said plate at said portion thereof and each having a pair of exposed ends respectively located at said opposed faces of said plate, the exposed ends of said second pair of contacts at one of said faces of said plate respectively engaging said first-mentioned pair of contacts when said plate has been shifted to said position; fastening means engaging said plate and said housing for releasably fastening said plate to said housing when said plate has been shifted to said position thereof; a handle fixed to and extending from said plate; a switch carried by said handle; a pair of electrical conductors connecting said swtich electrically to said second pair of contacts, respectively; and a switch-operating trigger carried by said handle adjacent said switch for opening and closing the latter at the option of the operator so that a circuit in which said first-mentioned pair of contacts are located can be opened and closed by manipulation of said trigger.

8. In a camera as recited in claim 7, said contact carrier and said opening of said plate both being of a generally rectangular configuration.

9. In a camera as recited in claim 8, said plate being elongated and said opening thereof extending longitudinally of said plate.

References Cited by the Examiner
UNITED STATES PATENTS

| 2,498,137 | 2/50 | Ryder | 95—86 |
| 2,780,156 | 2/57 | Thevenaz | 95—86 |
| 2,949,838 | 4/60 | Skalabrin | 95—86 |
| 2,961,937 | 11/60 | Karpf | 95—86 |

NORTON ANSHER, Primary Examiner.
DELBERT B. LOWE, Examiner.